A. MOWATT.
HARROW FOR ELIMINATING QUACK GRASS AND THE LIKE.
APPLICATION FILED SEPT. 25, 1919.
1,350,512. Patented Aug. 24, 1920.
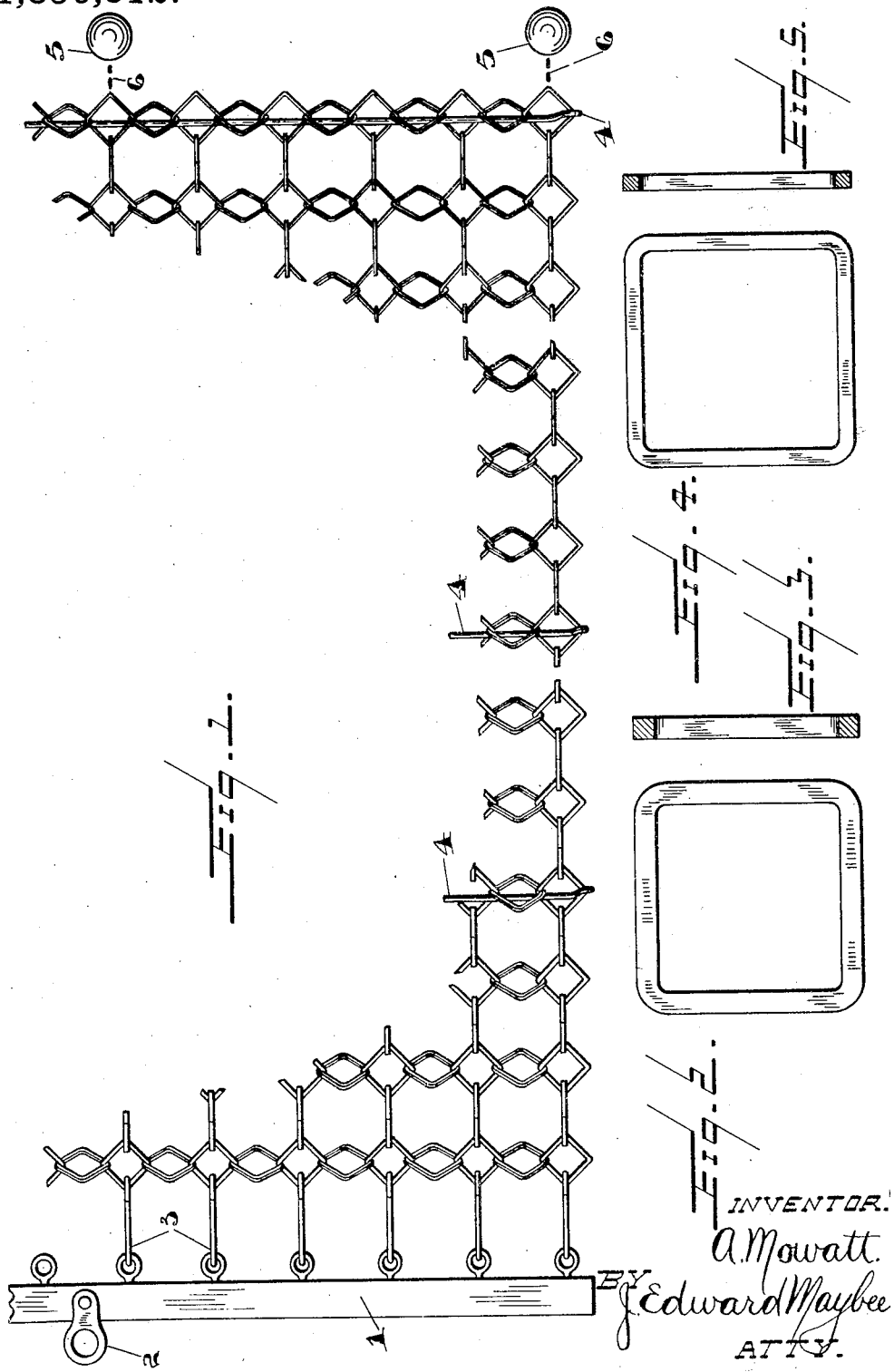

UNITED STATES PATENT OFFICE.

ALEXANDER MOWATT, OF WARKWORTH, ONTARIO, CANADA, ASSIGNOR, BY DIRECT AND MESNE ASSIGNMENTS, OF ONE-THIRD TO JAMES H. E. VROOMAN, ONE-THIRD TO BURTON ASSELSTINE, AND ONE-THIRD TO ELSWORTH MASTIN, ALL OF BELLEVILLE, ONTARIO, CANADA.

HARROW FOR ELIMINATING QUACK-GRASS AND THE LIKE.

1,350,512.      Specification of Letters Patent.    Patented Aug. 24, 1920.

Application filed September 25, 1919. Serial No. 326,118.

*To all whom it may concern:*

Be it known that I, ALEXANDER MOWATT, of the village of Warkworth, in the county of Northumberland, Province of Ontario, Canada, have invented certain new and useful Improvements in Harrows for Eliminating Quack-Grass and the like, of which the following is a specification.

This invention relates to implements adapted for use after plowing to produce a fine seed bed, and my object is to devise an implement of this type which will be particularly effective in dragging and rolling up obnoxious weeds and particularly the root stocks of quack grass or the like.

I attain my object by forming a chain drag of links connected both longitudinally and transversely. Either the transverse links or the longitudinal links or all of them are of rectangular form and substantially square cross section. Further, while all the links are of substantially the same outside dimensions, the front section of the device is formed of links of greater cross-sectional area of metal than the links of the rear section of the device while the total weight of metal in the rear section is made substantially equal to that in the front section by increasing the number of links therein.

Other details of construction are hereinafter more specifically described and the whole device is illustrated in the accompanying drawings in which—

Figure 1 is a plan view, partly broken away, showing an implement constructed in accordance with my invention;

Fig. 2 a plan view of a single link of the forward section of the harrow;

Fig. 3 a cross section of the same;

Fig. 4 a plan view of one of the links of the rearward section of the harrow; and Fig. 5 a cross section of the same.

In the drawings like numerals of reference indicate corresponding parts in the different figures.

1 represents a horizontal draw bar or doubletree, which is provided with the draft connection 2 pivotally connected to its forward side adapted for connection with the motive power.

To this draw bar are pivotally connected a plurality of draw irons 3, preferably twelve in number and about ten inches in length. These draw irons are connected to the end links of the longitudinal rows of a chain drag comprising interconnected transverse and longitudinal rows of links.

In the preferred construction the longitudinal rows of links are each composed of twenty-five links, while there are twenty-three links in each transverse row. Both the length and width may be decreased to suit the motive power available. A plurality of cross bars 4 extend over the top of the drag and have their ends connected to the links at opposite sides of the implement. These serve to keep the device extended in width. To keep the device extended longitudinally, I provide a plurality of weights 5 connected by short chains 6 with the rear end links as shown.

All the links in the transverse rows are of rectangular form and substantially square in cross section as shown in Figs. 2 to 5 of the drawings. Preferably also all the links in the longitudinal rows are of the same shape.

Another peculiarity of the construction of the harrow which is of the greatest importance in its operation will be understood on reference particularly to the aforesaid figures of the drawings. The first eleven links of each longitudinal row and the transverse links connected therewith while of substantially the same outside dimensions as the remaining links of the device are of greater cross sectional area than the links of the rest of the device, the individual links thus being of greater weight in the front section of the device than in the rear section of the device. As, however, there are fourteen links in the longitudinal rows of the rear section of the device the total weight of the rear section of the device is substantially the same as that of the forward section of the device. The result of this construction is that while there is a continuous gathering of weeds concurrent with the leveling and pulverizing of the surface, the rearward part of the harrow rolls up and discharges successive bundles of weeds automatically.

The links which I find it preferable to employ are 4" in diameter each way, making the links square in shape with slightly rounded corners. The heavier links of the forward section are formed of material square in cross section having a diameter of $\frac{3}{8}''$, while the lighter links of the rearward section are formed of material square in section having a diameter of $\frac{5}{16}''$. I do not wish to confine myself, of course, to the exact dimensions specified.

What I claim as my invention is:—

1. An implement of the class described comprising a draw bar; a chain drag connected therewith comprising a plurality of rows of connected links extending both longitudinally and transversely of the device, one series of rows of links being formed of rectangular links of substantially square cross section, the drag being formed in two sections, the links of the forward section being of substantially the same size as the links of the rearward section, but of greater cross sectional area, the total weight of the rearward section being made substantially the same as that of the forward section by the inclusion therein of a larger number of links.

2. An implement constructed substantially as set forth in claim 1 in which the links of both series of rows are rectangular in shape and of substantially square cross section.

Signed at Warkworth this 9th day of September, 1919.

ALEXANDER MOWATT.

Witness:
P. S. EWING.